United States Patent [19]

Engelmann et al.

[11] Patent Number: 5,537,588
[45] Date of Patent: Jul. 16, 1996

[54] PARTITIONED LOG-STRUCTURED FILE SYSTEM AND METHODS FOR OPERATING THE SAME

[75] Inventors: Thomas R. Engelmann, Los Gatos; Kevin F. Smith, San Jose; Aare Onton; Chia-Hon Chien, both of Saratoga, all of Calif.

[73] Assignee: International Business Machines Corporation, Armonk, N.Y.

[21] Appl. No.: 241,980

[22] Filed: May 11, 1994

[51] Int. Cl.⁶ .................... G06F 17/30; G06F 12/02
[52] U.S. Cl. .................. 395/600; 395/441; 364/282.1; 364/283.1; 364/245; 364/246.3; 364/DIG. 1
[58] Field of Search ................... 395/600, 180, 395/182.17, 182.14, 439, 440, 441, 445, 497.02

[56] References Cited

U.S. PATENT DOCUMENTS

| | | | |
|---|---|---|---|
| 5,231,593 | 7/1993 | Notess | 364/550 |
| 5,237,460 | 8/1993 | Miller et al. | 360/8 |
| 5,243,543 | 9/1993 | Notess | 364/550 |
| 5,418,921 | 5/1995 | Cortney et al. | 395/441 |

FOREIGN PATENT DOCUMENTS

| | | |
|---|---|---|
| 120330A3 | 10/1984 | European Pat. Off. |
| 493984A3 | 7/1992 | European Pat. Off. |
| WO92/09035 | 5/1992 | WIPO |

OTHER PUBLICATIONS

Fred Dougtis et al., "Log-Structured File Systems," COMPCON Spring '89 IEEE Computer Society Int'l Conf., pp. 124–129.

ACM Transactions on Computer Systems—vol. 10, No. 1—Feb. 1992—(pp. 26–52)—M. Rosenblum et al.—'The Design and Implementation of a Log–Structured File System'.

IBM Technical Disclosure Bulletin—Jan., 1991, US, AN NN9101270, vol. 33, No. 8, pp. 270–272 'Using Dual Actuator Shared Data Direct Access Storage Devices Drives in a Redundant Array'.

European Search Report—EP 95 30 2516—Dated 19 Sep. 1995.

"The Design and Implementation Of A Log–Structured File System", M. Rosenblum et al., ACM Transactions on Computer Systems, vol. 10, No. 1, Feb. 1992 pp. 26–52.

"A Case For Redundant Arrays Of Inexpensive Disks (RAID)", D. Patterson et al., ACM Sigmod Conference, Chicago, IL, Jun. 1–3, 1988, pp. 109–116.

IBM Technical Disclosure Bulletin, "Synchronous Pair Block Recording", R. Baird et al., IBM Corporation, vol. 25, No. 4, Sept. 1982 pp. 2053–2056.

*Primary Examiner*—Paul V. Kulik
*Attorney, Agent, or Firm*—Ohlandt, Greeley, Ruggiero & Perle

[57] ABSTRACT

Apparatus and method for operating a data processing system (10) having a data processor (12), a disk data storage subsystem (14), and a disk manager (16). The method includes the steps of (a) partitioning the disk data storage system into multiple partitions including a first partition (28) and a second partition (30); (b) managing at least the first partition as a log-structured file system (LSFS) for storing segments comprised of active data units, for example logical tracks, each having, when stored, an access activity value that exceeds a first predetermined threshold; and (c) storing, within the second partition, segments comprised of inactive data units each having an access activity value, when stored, that is less than the first predetermined threshold.

25 Claims, 6 Drawing Sheets

FIG. 5
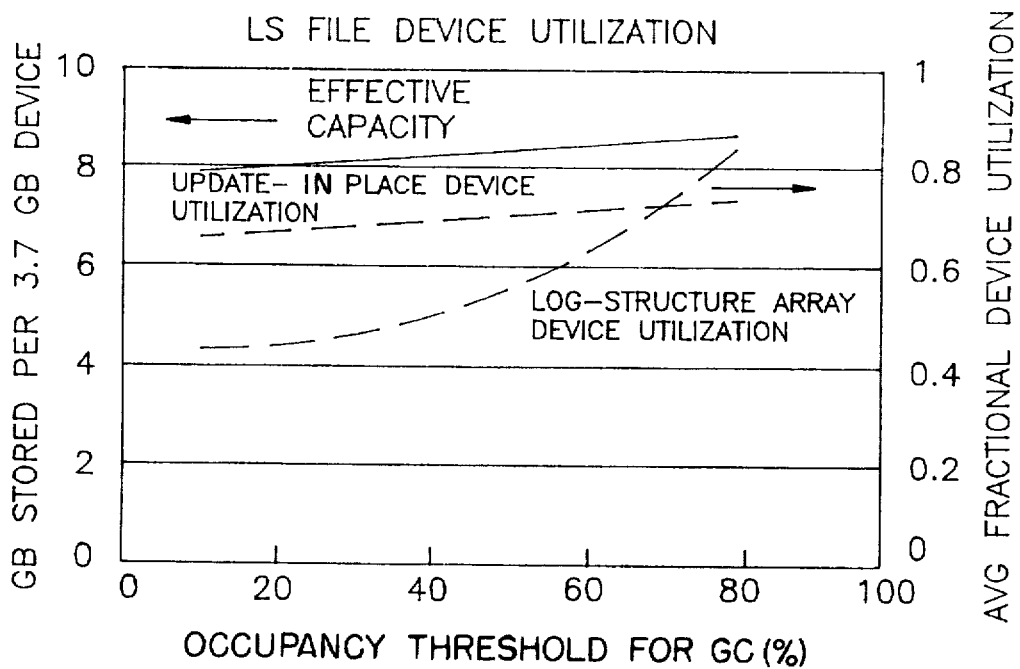
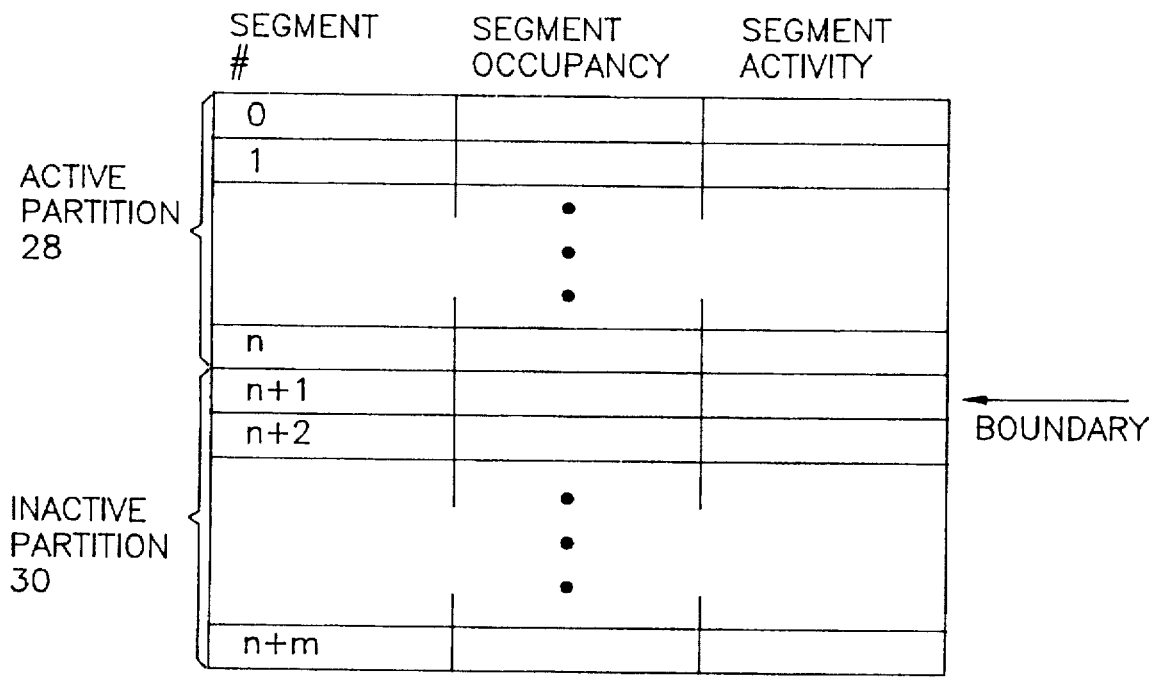
FIG. 7
SEGMENT
OCCUPANCY/ACTIVITY
TABLE

LOGICAL TO PHYSICAL TRACK DIRECTORY

PARTITIONED LOG-STRUCTURED FILE SYSTEM AND METHODS FOR OPERATING THE SAME

FIELD OF THE INVENTION

This invention relates generally to methods and apparatus for managing mass storage devices and, in particular, to log-structured file systems for mass storage devices.

BACKGROUND OF THE INVENTION

A log-structured file system (hereinafter referred to as LSFS) is described by M. Rosenblum and John K. Ousterhout in an article entitled "The Design and Implementation of a Log-Structured File System", ACM Transactions on Computer Systems, Vol. 10, No. 1, February 1992, pages 26–52.

Briefly, the LSFS is a technique for disk storage management wherein all modifications to a disk are written sequentially to a log-like file structure. The log-like file structure is the only structure on the disk, and it contains indexing information so that the files can be read back from the log in an efficient manner.

An aspect of the LSFS approach is that large free areas are maintained on the disk in order to speed-up the write process. To maintain the large free areas, the log is divided into segments, and a segment cleaner is employed to compress live information from heavily fragmented segments, thereby freeing up segments for subsequent writes.

A goal of the LSFS is to improve the efficiency of disk writes by utilizing a larger percentage of the disk bandwidth than other disk management techniques. That is, instead of making a large number of small writes to the disk, the data is instead collected in the storage subsystem cache or buffers, and the file cache is then written out to the disk in a single large I/O (disk write) operation. The physical writing of the segment, however, can proceed in increments.

One problem that arises from the use of such a LSFS is that compressed/compacted data can be scattered over multiple disk locations, thus reducing seek affinity and increasing response time.

Another problem that arises in the use of the LSFS relates to segment cleaning, also referred to herein as "garbage collection" (GC). More particularly, as the disk fills more and more disk activity is required for GC, thereby reducing the amount of time that the disk is available to service system requests.

Two mechanisms for performing free space management that are suggested in the above-referenced article include the use of a threaded log, where the log skips over active blocks and overwrites blocks of files that have been deleted or overwritten, and a copy and compact technique, where log space is generated by reading a section of disk at the end of the log, and rewriting the active blocks of that section, along with new data, into the newly generated space. However, both of these approaches require a significant allocation of disk resources to the management function, thereby adversely impacting the performance of the disk storage subsystem.

It is also known in the art to employ, instead of one large disk (also referred to as a Single Large Expensive Disk or SLED), a Redundant Array of Inexpensive Disks (RAID), as described by D. A Patterson, G. Gibson, and R. H. Katz in an article entitled "A Case for Redundant Arrays of Inexpensive Disks (RAID)", ACM SIGMOD Conference, Chicago, Ill., Jun. 1–3, 1988, pages 109–116. An advantage of the RAID approach is that it enables the disk subsystem of a data processor to keep pace with the continuing improvements in processor speed and main memory density. However, the authors show that the Mean Time To Failure (MTTF) of the RAID storage system is given by the MTTF of a single disk divided by the total number of disks in the array. As an example, if an array consists of 1,000 disks, each having an MTTF of 30,000 hours, then the MTTF for the array is only 30 hours, or slightly longer than one day. As such, an important consideration in the RAID system is the provision of error detection and correction information, check disks containing redundant information, and crash recovery techniques.

In this publication five different levels of RAID are discussed. Level one employs mirrored disks (full redundancy of all disks, both data and check disks), level 2 employs a hamming code for the error correction information to reduce the number of check disks., level 3 employs a single check disk per group of data disks, level 4 employs independent read/write operations wherein the individual transfer information is contained within a single disk unit and is not spread across several disks, and level 5 (RAID5) spreads both the data and the data integrity (parity) information across all disks, including the check disk.

OBJECTS OF THIS INVENTION

It is an object of this invention to provide an improved LSFS for use with mass storage devices.

It is another object of this invention to provide an improved LSFS with a RAID mass storage system.

It is one further object of this invention to provide an improved LSFS with a RAID3 or a RAID5 mass storage system, wherein the LSFS has multiple partitions including an active partition that is managed to obtain maximum performance, and an inactive partition that is managed to obtain maximum storage capacity.

It is a still further object of this invention to provide an improved LSFS with a RAID-type mass storage system, wherein the LSFS has multiple partitions including an active partition that is managed as a LSFS, and an inactive partition that is managed instead with physical data locations that are known to the access method.

SUMMARY OF THE INVENTION

The foregoing and other problems are overcome and the objects of the invention are realized by a method of operating a data processing system having, and by a data processing system constructed to have, a data processor, a disk data storage subsystem, and a disk manager. The method includes the steps of (a) partitioning the disk data storage system into multiple partitions including a first partition and a second partition; (b) managing at least the first partition as a log-structured file system for storing segments comprised of active data units each having, when stored, an access activity value that exceeds a first predetermined threshold; and (c) storing, within the second partition, segments comprised of inactive data units each having an access activity value, when stored, that is less than the first predetermined threshold.

In a presently preferred embodiment of the invention the segments that are stored within the first partition are stored in physically adjacent tracks on at least one surface of at least one disk, wherein the physically adjacent tracks begin with an initial track, wherein the initial track is located at approximately the middle of all of the tracks on the surface, and wherein the other physically adjacent tracks are arrayed on both sides of the initial track.

A method of forming clear tracks in the active partition, referred to generally as garbage collecting, maintains a segment record indicating occupied segments and clear segments within the first partition. The segment record includes for each occupied segment a sum value representing a summation of the access activity values for each of the constituent valid data units of the segment and further includes an occupancy value representing a number of valid constituent data units of the segment. It is noted that the sum value referred to here and subsequently in this description of the invention can be a simple sum or an average value. Responsive to a condition wherein a number of clear segments is less than a predetermined value, the method performs the steps of (a) accessing in turn occupied segments of the first partition to locate a segment having a sum value that is less than the first predetermined threshold; (b) storing in a first buffer those valid data units, if any, of the located segment that have an access activity value that is greater than the first predetermined threshold; and (c) storing in a second buffer those valid data units, if any, of the located segment that have an access activity value that is less than the first predetermined threshold. Responsive to a condition wherein all of the occupied segments are found to have a sum value that is greater than the first predetermined threshold, the method also performs the steps of (d) accessing in turn occupied segments of the first partition to locate a segment having an occupancy value that is less than a second predetermined threshold; (e) storing in the first buffer those valid data units, if any, of the located segment that have an access activity value that is greater than the first predetermined threshold; and (f) storing in the second buffer those valid data units, if any, of the located segment that have an access activity value that is less than the first predetermined threshold.

BRIEF DESCRIPTION OF THE DRAWINGS

The above set forth and other features of the invention are made more apparent in the ensuing Detailed Description of the Invention when read in conjunction with the attached Drawings, wherein:

FIG. 5 is a graph illustrating device utilization for a two partition pure LSFS technique and an LSFS having an update-in-place capability;

FIG. 7 illustrates the format of a segment occupancy/activity table;

DETAILED DESCRIPTION OF THE INVENTION

Figure 1:
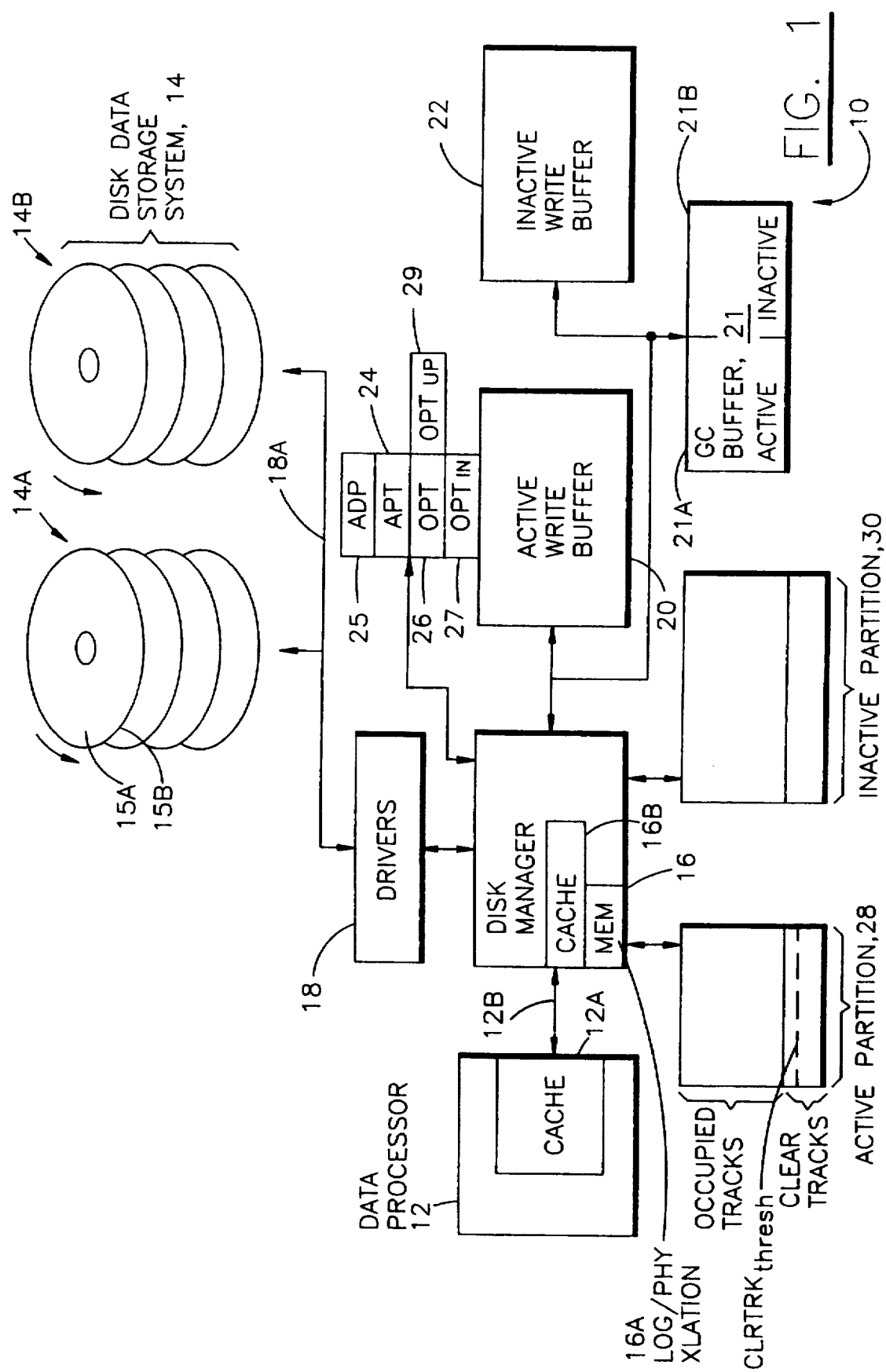
FIG. 1 is a block diagram illustrating a data processing system that is constructed and operated in accordance with this invention.

Reference is made to the block diagram of FIG. 1 for showing a data processing system 10 that is constructed and operated in accordance with this invention. System 10 includes a data processor 12. Bidirectionally coupled to the data processor 12 is a data path 12b and an associated disk data storage system 14. The disk data storage system 14 may comprise from one disk unit to a plurality of disk units. For example, in the illustrated embodiment the disk data storage system 14 is comprised of a first disk unit 14a and a second disk unit 14b. Each disk unit may comprise from one to n individual disks each having a first data storage surface 15a and a second data storage surface 15b.

In a presently preferred embodiment of this invention the disk data storage system 14 is organized and operated as a RAID system that is somewhat similar to the RAID5 system described in the Patterson, Gibson, and Katz publication referenced in the Background portion of the specification. It should be realized that the use of RAID-type of disk data storage system is not to be construed as a limitation upon the practice of this invention.

The system 10 further includes a LSFS disk controller or manager 16 that operates in accordance with the teaching of this invention. Coupled between the disk data storage system 14 and the LSFS disk manager 16 are the necessary disk device drivers 18. The drivers 18 interact with the disk units 14a and 14b at a low level so as to enable the disk units to be read and written. The understanding of the functioning of the drivers 18 is not germane to an understanding of this invention. As an example only, the disks 14a and 14b, and the drivers 18, may all be connected through a bus 18a such as a well known SCSI bus.

The disk manager 16 includes an associated cache memory 16b. The cache memory 16b may be comprised of non-volatile storage (NVS) devices.

Figure 8:
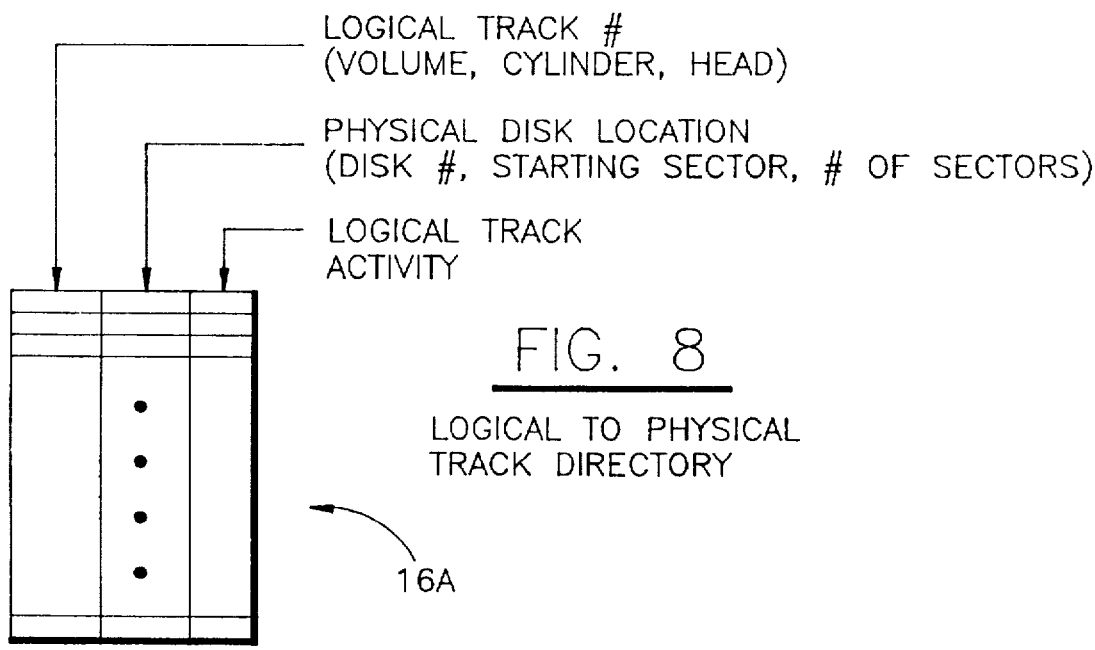
FIG. 8 illustrates the format of a logical to physical track directory.

Also coupled to the LSFS disk manager 16 is an active partition write buffer 20, a garbage collection (GC) read buffer 21, an inactive partition write buffer 22, an activity parameter threshold (APT) register 24, an occupancy parameter threshold (OPT) register 26, a buffer storing an active partition data structure 28, and a buffer storing an inactive partition data structure 30. The buffers referred to in this description may contain data or may be comprised of pointers to the location(s) of the actual data. Components 20–30 are employed by the teaching of this invention in the manner described in detail below. The data structures 28 and 30 model the partitioning of the disk data storage system 14, and may not exist as separate entities from the physical disks 14a and 14b. An exemplary format of the data structures 28 and 30 is illustrated in FIG. 7, wherein the occupancy field stores a number of valid logical tracks within a segment, and wherein the activity field stores the sum of valid logical track activity values within the segment. These values are used during garbage collection, as described below. The LSFS disk manager 16 also includes a memory 16a for storing a logical to physical access translation data for the LSFS. FIG. 8 illustrates an exemplary format for the data stored within the memory 16a.

By way of introduction, various elements of this invention which are described more fully below include the following.

A first element pertains to the use of multiple disk partitions that are differentiated by the activity characteristics of the data stored in each partition. As employed herein a two partition LSFS (active and inactive) is but one example of a multiple partition LSFS.

A second element pertains to the use of a disk target location (designated as track 00) from which garbage collection (GC) begins and to which all writes are done, as closely as possible.

A third element pertains to the use of "logical unit activity" as a criterion for relocation of data read back from the disk data storage system 14 when performing GC. Activity is a relative number that is associated with the logical access unit based on the frequency with which it is read, or written, or both in combination or separately. Also associated with logical unit activity is an "activity decay parameter", shown as ADP 25 in FIG. 1, which describes the rate at which past activity is allowed to decay in relative importance to current activity. The ADP 25 may be based on a number of requests to the disk data storage system 14, or may be based on chronological time. The ADP 25 may thus be used for every access to the disk storage system 14 so as to reduce the activity value for those logical units that are not accessed, or may be used once per unit time to reduce the activity value for any logical units that were not accessed within the time period. In either case, the activity value will come to reflect the amount (frequency) of read or write activity associated with a particular logical unit.

A fourth element is the use of an "occupancy parameter" for a RAID parity-group segment which is written at one time to the LSFS that is stored within the disk data storage system 14. As is seen more clearly in FIG. 9, a parity group segment may correspond to the physical tracks, such as physical track 17, of each of a group of disk devices which belong to and constitute one parity group. As an example, if there are eight disk drives each having eight disks for a total of 16 surfaces per drive, a parity group segment may correspond to the same numbered physical track on each of the 128 surfaces. Compressed write data is buffered until the entire parity group segment can be written at one time, thereby reducing the number of accesses to the disk system. The corresponding parity information is also written to the designated check disk drive, which can change for each parity group segment that is written. It should be noted that a distinction is made between physical tracks and logical tracks. That is, because of data compression a single physical track may comprise n logical tracks. For an average compression ratio of three, for example, each physical track may store three logical tracks.

Figure 9:
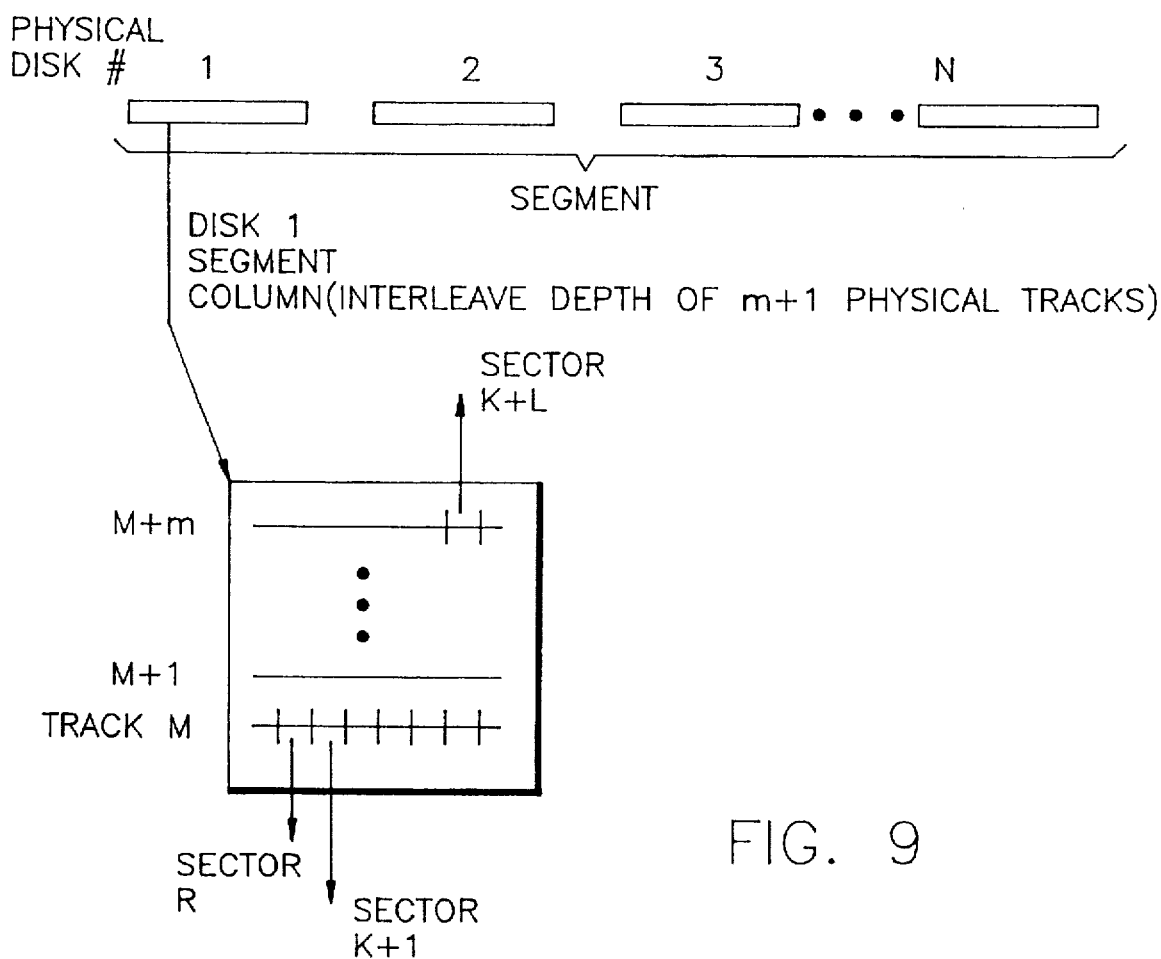
FIG. 9 illustrates a segment written over N disks in a RAID storage system, and further illustrates the sectors of a single segment column within one of the disks.

In FIG. 9 an interleave depth of m+1 physical tracks is shown for the disk 1 segment column. It should be realized that the interleave depth can also be specified as an extent of L+1 physical sectors. In general, an interleave depth of one implies that one parity group segment will occupy one physical track, an interleave depth of two implies that one parity group segment will occupy two physical tracks, etc.

The occupancy parameter is defined to be a fraction of fixed data (i.e., not parity) blocks occupied by valid logical tracks in the parity-group segment.

A fourth element is the use of an "activity parameter" which is the sum of the valid logical track activity values for all of the logical tracks that comprise a parity-group segment.

A fifth, related element is the use of the APT 24 and the OPT 26 thresholds for the activity parameter and the occupancy parameter, respectively, at which thresholds associated disk management activity is initiated.

It has been realized that a characteristic of many data processing applications is that some data is "consistently active" at any given time, while most of the data on the disk is not accessed, even once, over periods of, by example, 15 minutes or even a day. This invention uses this disparity in data activity to advantage. More particularly, "active" data is targeted to one partition on the disk, herein referred to as the "active" partition. Data that does not qualify as "active" is placed in a second partition, the "inactive" partition. In the first embodiment of this invention both the active and the inactive partitions are managed as a LSFS.

In accordance with a first embodiment of this invention, this partitioning of data enables the LSFS disk manager 16 to manage the active data to achieve optimum performance. The loss of disk storage efficiency associated with management for performance is acceptable since the active data typically represents a small fraction of the total disk space. The inactive partition is preferably managed for maximum storage capacity. The loss of performance associated with management for storage efficiency is acceptable since the disk activity associated with the inactive data represents a small fraction of the total disk activity.

The partitioning of data into active and inactive partitions is advantageous so long as the rate at which "active" data becomes "inactive", and vice versa, is low compared to the total access rate to the disk data storage system 14. This is believed to be the case for a large number of different applications.

Figure 2:
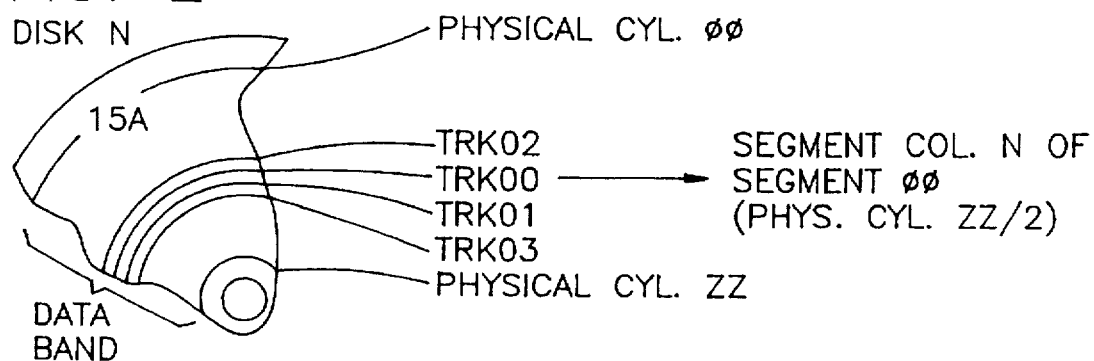
FIG. 2 illustrates a portion of a disk and shows a track organization that is feature of the LSFS management system of this invention.

As is shown in FIG. 2, which illustrates the disk N of FIG. 9, in the two-partition LSFS the active partition may be considered to be centered on the middle physical track of each of the disk drive units 14a, 14b. This physically "middle" track of the disk drive unit 14a, 14b is referred to as a "target" track of the active partition and is assigned track number 00. That is, for a disk having physical cylinders 00-zz, segment column N of segment 00 is physically located at physical cylinder #zz/2. Track number 01 (segment column N+1) is the physically next track and track number 02 (segment column N+2) is the physically preceding track, etc. proceeding from the middle of the disk outward. When the disk manager 16 has assembled a full-parity-width segment of "new" or "updated" data it is given the lowest number clear track into which to write the data. Thus "new" or "updated" data is always written as closely as possible to the physical middle of the disk surface 15a, 15b. The target track (or cylinder column) in the inactive partition is the lowest numbered track in that partition. In accordance with this technique the tracks associated with the inactive partition are physically located at the inner and outer peripheral regions of each disk surface, where longer seek times will typically be incurred.

Once a full-parity-width track (segment) has been released for writing, the disk manager 14 makes a determination as to whether it is time to initiate GC to replace this track, and on what basis to select the tracks for GC. Whether to initiate GC is determined by the number of clear tracks (segments) remaining in the "active" partition, as reflected in the active partition data structure 28.

If, for example, the management objective is to have 10% of the tracks (segments) in the active partition "clear" and ready for writing, and if the number of "clear" tracks has fallen below this threshold value ($CLRTRK_{thresh}$), GC is initiated to clear one "net" track. Clearing one "net" track refers to the fact that enough tracks must be GC'd so that when the valid data thus read in (to the GC buffer 21) is rewritten, one "net" clear track (segment) is gained by the GC process.

Which tracks to GC (i.e., to read the valid data on those tracks into buffers) is determined by two criteria for the active partition. The first criterion is that of track (segment) total activity, the above-mentioned activity parameter, in combination with the associated Activity Parameter Threshold 24.

Figure 3:
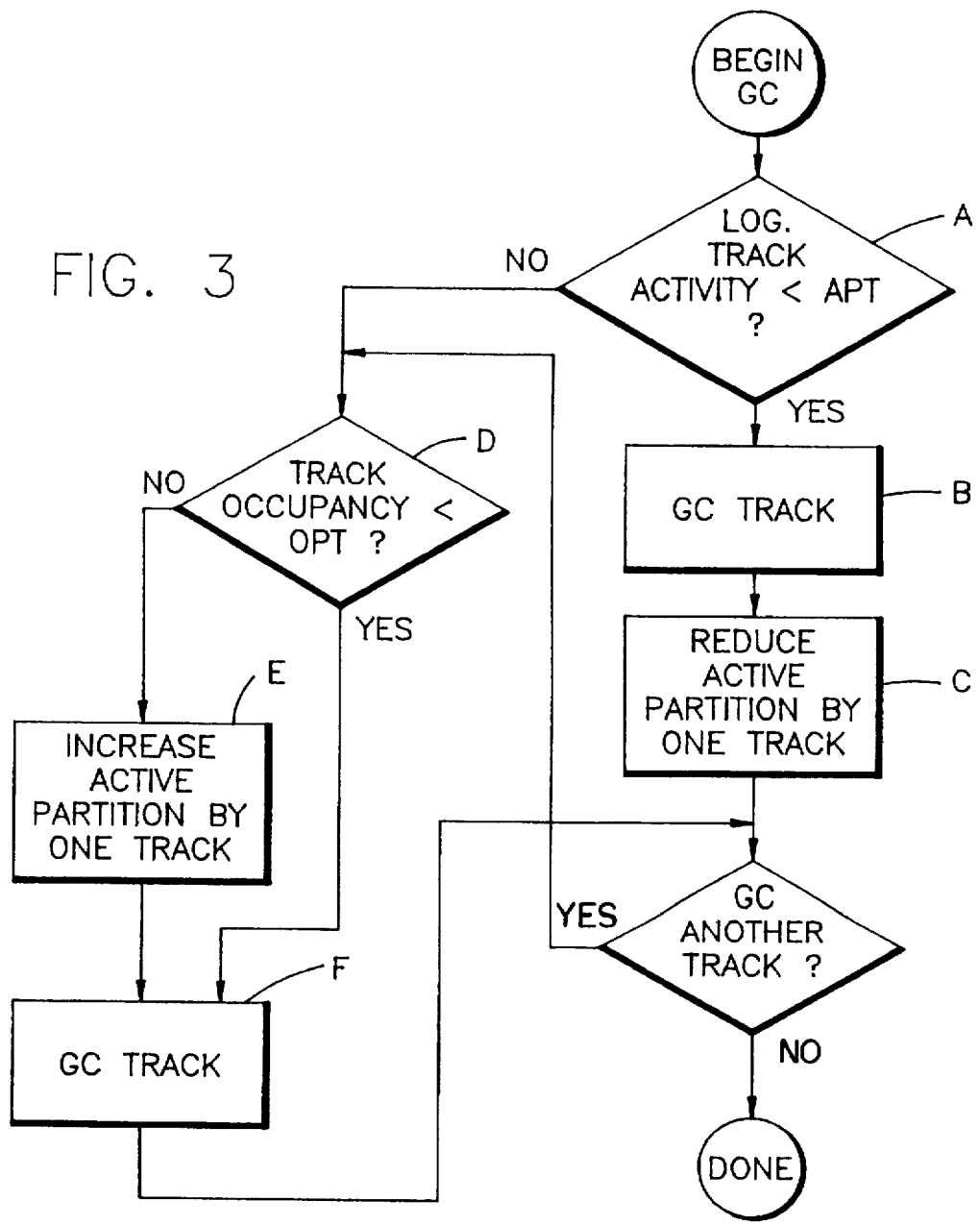
FIG. 3 is a logic flow diagram illustrating a method of garbage collection that is a feature of this invention (each reference to a "track" in the drawings can also be taken as a reference to a "segment")

Referring to the logic flow diagram of FIG. 3, a search is first made of the track (segment) activities beginning with track 00 (Block A). The first track (segment) wherein the sum of the valid logical track activities (as indicated in the segment occupancy/activity table of FIG. 7) is below the value specified by the APT 24 is GC'd (Block B). If the size of the active partition is also actively managed, then GC'ing a track (segment) in accordance with the APT 24 also reduces the size of the active partition by one track (segment); i.e., the last track (segment) number in the active partition 28 is reduced from n to n−1 (Block C). Further GC of tracks that may be necessary as a result of this GC operation is done in accordance with the track occupancy threshold, as described below.

If in selecting track (segments) to GC in the active partition none are found below the activity parameter threshold, or if one track (segment) was GC'd and more tracks (segments) must be GC'd to obtain one net track, the OPT 26 is used in selecting the next track (segment) to GC. A search is made, again beginning with track (segment) number 00, for a track (segment) whose occupancy value (as indicated in the segment occupancy/activity table of FIG. 7) is below the OPT 26 (Block D). If none is found in the active partition, the last track (segment) number in the active partition is increased at Block E from n to n+1 (assuming that the partition boundary is being actively managed) and track (segment) n+1 is GC'd. This latter process is repeated until one net track of clean space has been obtained.

As described above, the active partition is managed in size, track (segment) activity, and track (segment) occupancy. This process ensures both that inactive data is removed from the active partition, and that a distribution of track occupancies is produced whose minimum occupancy is approximately determined by the OPT 26. The size of the active partition is adjusted, as required, to achieve this distribution.

The value of the APT 24 thus establishes what fraction of system disk requests will go to the active partition of the disk data storage system 14. The value of the OPT 26 for the active partition establishes the amount of GC overhead associated with writes to the active partition. The OPT 26 is also the principal determinant of the size of active partition relative to the inactive partition. If data for a given workload is portioned in this manner into active and inactive data, the majority of the disk activity is concentrated in the physically contiguous tracks of the active partition, resulting in improved response time performance through seek affinity.

The description thus far has concentrated upon the activity of writing "new" or "updated" data to the disk data storage system 14. However, the valid data that is collected by the GC process and stored in the GC buffer 21 must be eventually rewritten to disk. The valid data is assembled during the GC operation into two GC buffers 21a and 21b according to activity criteria. Each compression unit is placed in the active GC buffer 21a or in the inactive GC buffer 21b according to whether its activity value is above or below the APT 24. The description here uses a sorting process on the level of the smallest non-splittable data unit. The sorting can also be done in a manner that keeps logically related together by using the average activity of the logical unit or "neighborhood" to determine the destination partition. When full-parity-width writes from the buffers 21a and 21b are accumulated they are written to the active and the inactive partitions as described above for the case of new or update writes. Under some conditions, it may be beneficial to combine the data destined to the active partition from new and update writes with GC'd data.

Writing of data from the inactive GC buffer 21b to the inactive disk partition is the only means of data entry into the inactive partition. If writing of data to the inactive partition requires the clearing of tracks, the GC for this clearing is targeted to the inactive partition only. It is thus desirable to have an independent occupancy threshold parameter for the inactive partition, shown in FIG. 1 as the $OPT_{in}$ 27. In general, the value of the $OPT_{in}$ 27 is preferably greater than the value of the OPT 26 that is associated with the active partition in order to improve the effective storage capacity of the inactive partition. As was indicated previously, the inactive partition represents the major part of the storage capacity of the system 10.

Thus far a description has been made of the operation of the disk manager 16 for (1) "new" or "updated" writes, (2) "active" data collected via GC, and (3) "inactive" data collected via GC. For those cases where almost all data is simultaneously read active and write active these three operations are sufficient to encompass the disk management function. However, for those cases wherein there is read-only activity on a significant amount of data, it is useful to consider one further case, referred to herein as "read-active" data.

Figure 4:
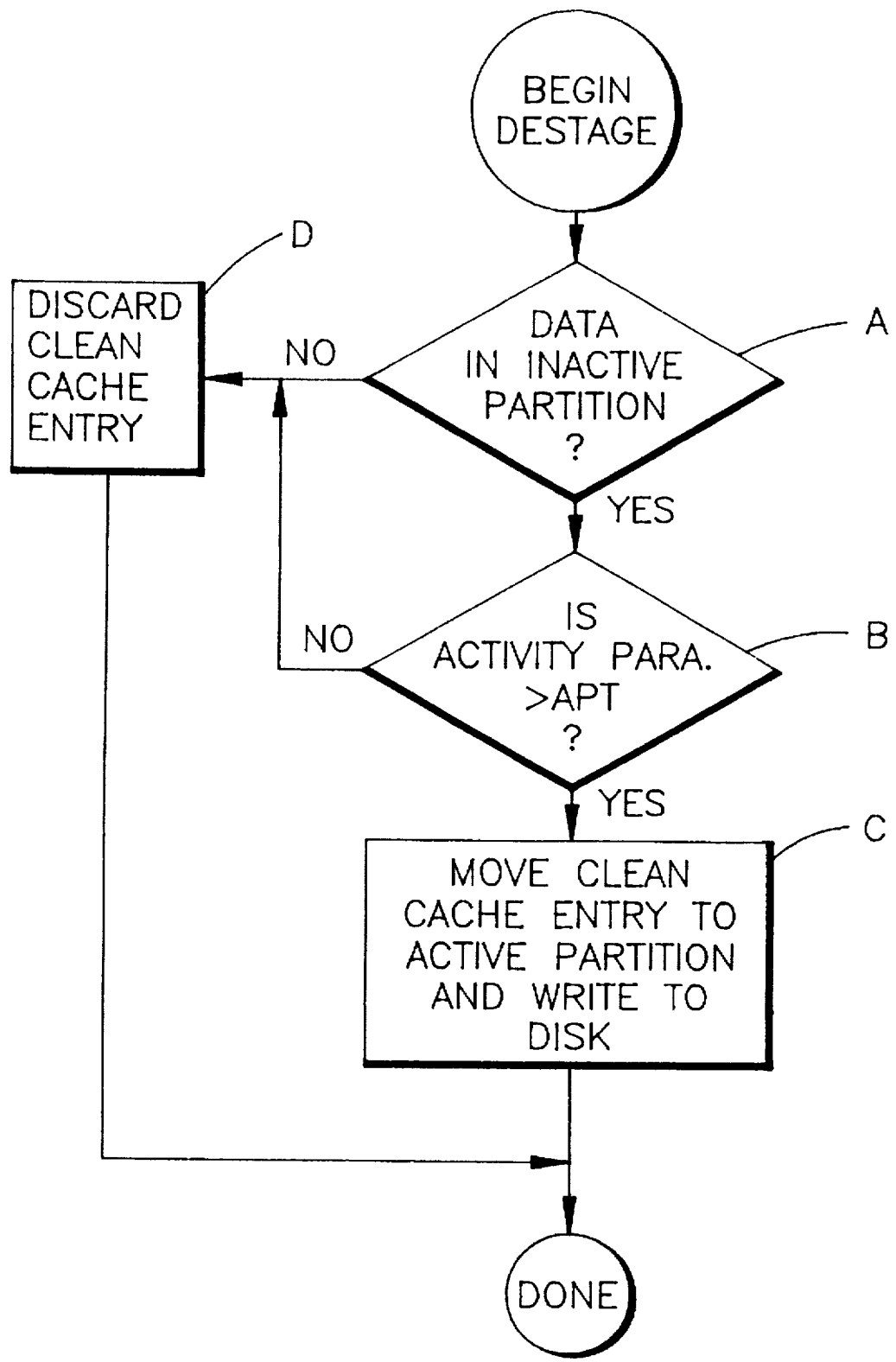
FIG. 4 is a logic flow diagram illustrating a method for adding data to an active partition upon an occurrence of a destaging of a clean cache entry.

Read-active data is considered to be data which is stored in the cache 16b without having been updated (written to) since it was staged to the cache 16b on a read-miss operation (a "clean" cache entry). Maintaining a read-active data category implies that at some point before it would be replaced in cache by a cache data replacement mechanism (not shown), its activity value is evaluated relative to the activity threshold that determines the boundary between the active and inactive partitions. As shown in the logic flow diagram of FIG. 4, if the corresponding data in the disk data storage system 14 is in the inactive partition (Block A), and if its activity value exceeds the value of the APT 24 for the active partition (Block B), the discard of the "clean" cache entry is treated identically to that of the destage of an "update" write (Block C); thus in effect moving that data to the active LSFS disk partition. If the data on the disk is already in the active partition, the "clean" cache entry is simply discarded in a conventional manner without being written back to disk (Block D).

The decision of whether to employ the "read-active" category for data management is a function of the workload environment. The use of the "read-active" category can enhance performance in "read-mostly" environments. However, the use of the "read-active" category will cause some reads to have the same overhead that is associated with write operations. As a result, in some cases the response time gains may not justify the higher disk utilization associated with rearranging the read-only data into the active disk partition.

Thus far the description of this invention has demonstrated that the seek affinity is enhanced by physically segregating active data in the process of managing the LSFS. It should be noted, however, that this process will not guarantee that sequentially written logical tracks will in fact appear sequentially on the physical disk(s) 14a and 14b. One partial solution to this problem is a procedure known to be used in RAID5, where a write destage from the cache 16b also initiates a search of the cache 16b for other writes on the same logical cylinder or other unit. In this manner any other pending writes on the same logical unit are destaged together.

In accordance with a further aspect of this invention, and in addition to the technique just described, the write buffer 20 to which these cache destages are moved is made several times as large as one parity-array track (segment). When the write buffer 20 fills to a triggering threshold, for example, five times the capacity of a parity-array track (segment), a sort by logical device and ordering by logical track is performed on the buffered write data (see FIG. 8) to facilitate the detection and simultaneous writing to disk of logically sequential data. That is, the longest sequential series is written out first. The enlarged write buffer 20 also facilitates the efficient packing of compressed logical tracks onto physical tracks.

Another aspect of LSFS management that is a feature of this invention is the use of physical disk idle time to perform data management. As described above, GC is initiated when a write operation brings the number of available clear tracks below the $CLRTRK_{thresh}$ value (for example 10%). This approach may be referred to as "demand driven" GC.

The further aspect of this invention employs a utility routine to check the total disk activity. If it is found that the current activity in a parity-array group is such that the majority of the devices are idle, or other decision criteria, the GC of one parity-array track (segment) is queued to the idle group. This is referred to herein as "time driven" GC. An example of an idle threshold is if half or more of the disks comprising the physical storage of a segment have no outstanding work to do. In this regard the disk manager 16 knows if the devices are busy with a request because it knows if a response is pending. The parity-array track (segment) chosen for GC in the time driven mode is selected by the same criteria as in the demand driven mode, except that in using the track (segment) occupancy threshold (OPT 26) the lowest occupancy track (segment) is selected for GC until an upper occupancy threshold ($OPT_{up}$) 29 is reached. Exemplary values for the occupancy threshold values are 25% and 75% for the lower and upper occupancy thresholds, respectively.

In summary, the embodiments of the invention described thus far enable the management of a log-structured file system on a RAID5 parity-array disk storage system, and permit a largely independent optimization of the response time performance and effective storage capacity. This is achieved through the use of independent management criteria for multiple partitions, and the identification and use of parity-array segment activity, occupancy parameters, and thresholds that enable the size of the active and the inactive partitions to be self-adjusting.

Having thus described a first embodiment of the multi-partition LSFS of this invention, the ensuing description is directed to a second embodiment of the multi-partition LSFS. In the second embodiment the first, active partition is managed as described above, while the second, inactive partition is managed in a non-LSFS manner, wherein all physical data locations are known to the access method. The motivation for this second embodiment is based on a number of observations.

First, record-level cache applications may be less efficient in access resource and cache space if data is required to be managed at a "neighborhood" unit level larger than the record. However, if the entire system were managed at a record level, it is possible that the logical to physical relocation table size (FIG. 8) would become uneconomically large.

Second, large serial accesses may also be less efficient if data that is normally accessed as a logical group is physically scattered over the disk.

Third, maintaining the logical to physical location directory (memory 16a, FIG. 8) in semiconductor storage implies a need for a large semiconductor storage; of the order of the size of the cache 16b. Although it is possible to maintain only a portion of this directory in semiconductor memory and the remainder on disk, a performance penalty is incurred when retrieving a required portion of the directory from disk.

Fourth, high segment occupancy may make the LSFS less efficient than update-in-place.

In order to overcome and mitigate these effects this aspect of the invention also employs a partitioned log-structured file system, where the partitions are managed to maintain active data in one partition 28 and inactive data in the other, much larger partition 30. However, instead of managing both partitions as log-structured files, only the active partition 28 is managed as a log-structured file while the larger, inactive partition 30 is managed in a more conventional manner with all physical data locations being known to the access method. Furthermore, all data, both active and inactive, has an allocated home location in the inactive partition 30. In effect, the inactive partition 30 is embodied as a RAID5 array with compressed data. The compressed data format preferably includes a provision to supply extra space so that most updates and extensions of compressed data can be accommodated in place.

FIG. 5 illustrates the results of a comparison between the relative device utilizations when managing data as a pure LSFS and as a LSFS with update-in-place capability. FIG. 5 specifically illustrates the results obtained from a two partitioned log-structured file on a RAID5 (7+P) array of devices with a physical storage capacity of 3.7 GB per device.

Garbage collection (GC) here refers to reading back sparse valid data from tracks (segments) wherein most of the data has been invalidated in the process of having been updated and rewritten to some other location according to the log-structured file strategy.

More particularly, FIG. 5 depicts the effective storage capacity and the device utilization for a two-partition log-structured RAID5 (7+P) array at a request rate of 4 req/s/GB and a read/write ratio of 3. The occupancy threshold for GC in the active partition 28 is shown along the abscissa. The GC threshold for the inactive partition 30 is assumed to be 80%. The illustrated update-in-place device utilization is not related to the OPT 26, but is instead shown as what it would be for the same effective capacity as obtained for the two partitioned log-structured array. It can be seen that for low values of the occupancy threshold for GC the log-structured array has a lower device utilization, whereas for high values of the occupancy threshold the update-in-place device utilization is lower.

It is noted in FIG. 5 that if the log-structured array storage system 14 is managed at an occupancy threshold of 25% for GC in the active partition 28 that the net device utilization is 0.47. This includes GC at an occupancy threshold of 80% in the second, inactive partition. It is further noted, however, that at the 80% occupancy threshold for GC, the GC in the inactive partition may actually have been more efficient if the update-in-place method were employed. Thus it is apparent that an optimal strategy for minimizing device utilization for certain applications is to manage the active partition 28 as a fully log-structured array and to manage the inactive partition 30 as an update-in-place array of compressed data.

Figure 6:
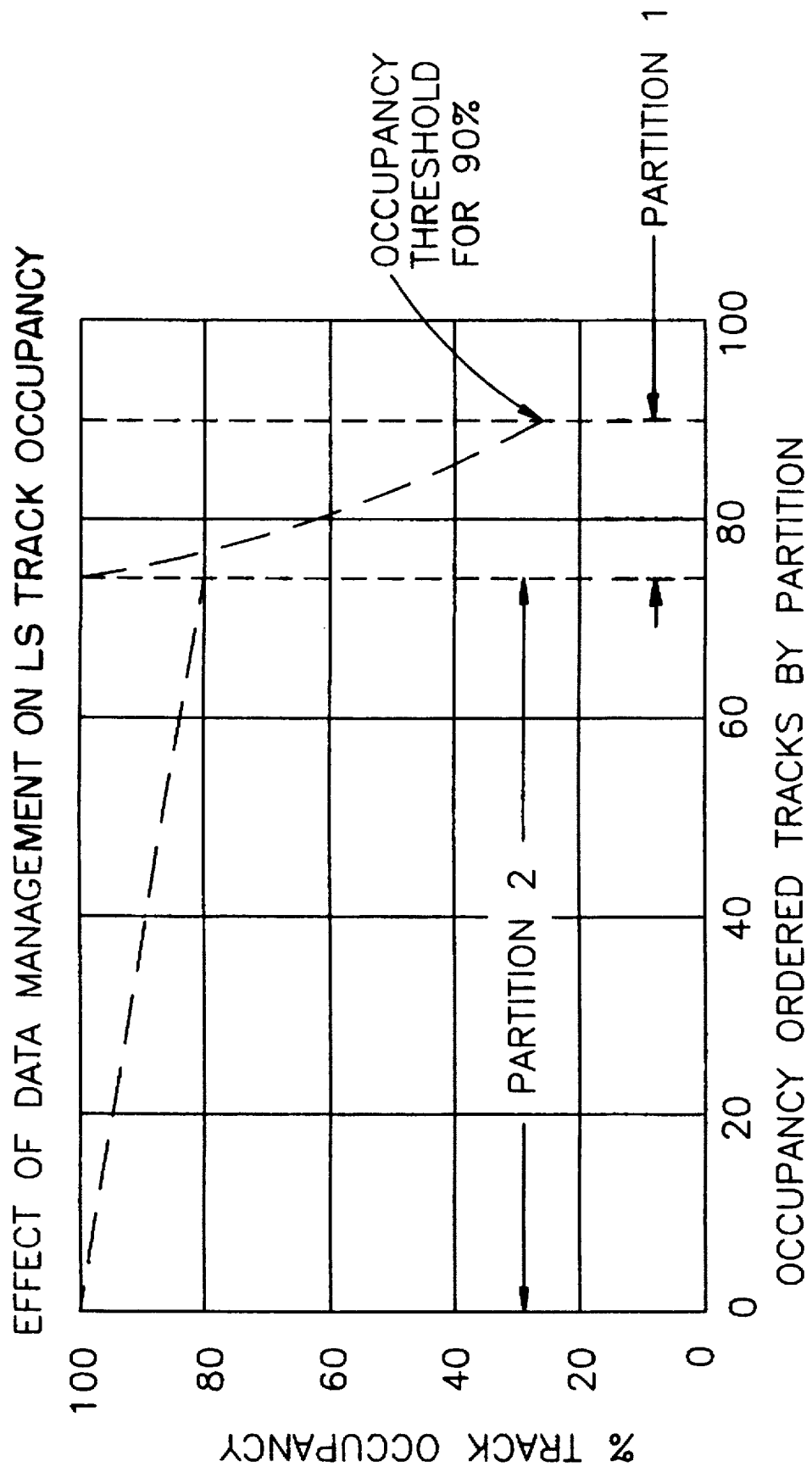
FIG. 6 is a graph depicting track occupancy in a two partition LSFS array device.

The effective capacity implications of this management strategy can be estimated from the graph of FIG. 6. From considerations such as those in FIG. 6 it can be found that for the operating point mentioned for FIG. 5 approximately 25% of the potential storage of the disk data storage system 14 in unavailable for storing permanent data because of the data management scheme employed. The same 75% of potential storage could be achieved by taking all of the compressed data (75%) and giving the compressed data fixed storage locations in the second, inactive partition 30. In this case gaps are left in the compressed data fields of the inactive partition, and also between allocations, to facilitate reallocation when the originally allocated data extents become full.

As an example, it may be assumed that the overhead for gaps in the data fields and between allocations in the second partition requires an additional 10% of the storage space at the time that the disk is considered to be filled. This leaves 15% of the disk space that can be managed as a log-structure file for the active data partition.

More particularly, FIG. 6 illustrates a conceptual diagram of track occupancy for the two partition log-structured array device. The inactive partition 30 comprises tracks 0 to 77%, the active partition 28 comprises tracks from 77% to 90%, and the tracks between 90% and 100% are a management reserve of clear tracks for both partitions. This diagram shows the active partition 28 managed to a GC occupancy threshold of 25% while the inactive partition 30 is managed to a threshold of 80%. The area under the two curves represents the effective storage capacity of the disk data storage system 14.

The management strategy for this embodiment of the invention uses the active partition 28 to capture all new and update writes, and any active data recovered by garbage collection. Only when data becomes inactive is it used to update the fixed location data in the second partition. Potentially there may be two valid copies of data on the disk if read-active data is copied into the active partition 28. Access to the second partition 30 would generally only occur if the addressed data can not be found in the active partition 28 (with the two exceptions noted below).

Record-level caching applications occur, for example, if a data-base application is required to access data in a skip-sequential manner. For such applications it is clearly more efficient for the disk manager 16 to access the data in the second partition directly in both the read and write mode. It is thus preferable that record-level applications be able to signal the disk manager 16 (for example, by using a record-level access bit in a disk request) that they need to access the second partition directly. Of course, provision is made in the disk manager 16 that, if some of the data requested exists is a more recent form in the cache 16b or the active partition 28, that these be accessed instead of the data in the second partition 30.

The serial data access of large data blocks is also clearly more efficient if accessed directly from the second (non-LSFS) partition 30, both in read and write mode. The signal line 12c is used in this case as with record-level applications described above.

As in the case of the first embodiment described previously, the access activity record is maintained for each neighborhood of the data in the active partition. This is necessary for the proper management of first, active partition 28 as a log-structured partition in a multiple partition file. In addition, however, an activity record is maintained for neighborhood unit in the second partition 30. The activity record may be used in the storage layout of data in the second partition 30 so that the most active data is allocated space closest to the tracks allocated for the active partition 28, thereby enhancing the performance for seeks to the second partition.

The advantages that are inherent in the second embodiment of this invention include the following. First, a lower device utilization is achieved. The lower device utilization results in decreased response times and/or increased disk capacities. Second, there is a reduction in memory requirements to store the disk "layout map". That is, the size of the memory 16a can be reduced because the track or record layout is only required for the relatively small amount of active data that is stored in the first partition that is managed as a LSFS. The inactive data can be represented with a very coarse granularity, such as by tracks. Third, the physical contiguity of logically contiguous data is more easily preserved, and fourth, the seek distance is shortened for the more active data.

While the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A method of operating a data processing system comprising a data processor, a disk data storage subsystem, and a disk manager, comprising the steps of:

partitioning the disk data storage system into multiple partitions including a first partition and a second partition;

managing at least said first partition as a log-structured file system for storing segments comprised of active data units each having, when stored, an access activity value that exceeds a first predetermined threshold; and storing, within the second partition, segments comprised of inactive data units each having an access activity value, when stored, that is less than the first predetermined threshold.

2. A method as set forth in claim 1 wherein the segments that are stored within the first partition are stored in physically adjacent tracks on at least one surface of at least one disk, wherein the physically adjacent tracks begin with an initial track, wherein the initial track is located at approximately the middle of all of the tracks on the surface, and wherein other the other physically adjacent tracks are arrayed on both sides of the initial track.

3. A method as set forth in claim 1 and further including the steps of:

maintaining a segment record indicating occupied segments and clear segments within the first partition, the segment record including for each occupied segment a combination value representing a combination of the access activity values for each of the constituent valid data units of the segment and further including an occupancy value representing a number of valid constituent data units of the segment;

responsive to a condition wherein a number of clear segments is less than a predetermined value, accessing in turn occupied segments of the first partition to locate a segment having a sum value that is less than the first predetermined threshold;

storing in a first buffer those valid data units, if any, of the located segment that have an access activity value that is greater than the first predetermined threshold;

storing in a second buffer those valid data units, if any, of the located segment that have an access activity value that is less than the first predetermined threshold;

responsive to a condition wherein all of the occupied segments are found to have a combination value that is greater than the first predetermined threshold;

accessing in turn occupied segments of the first partition to locate a segment having an occupancy value that is less than a second predetermined threshold;

storing in the first buffer those valid data units, if any, of the located segment that have an access activity value that is greater than the first predetermined threshold; and storing in the second buffer those valid data units, if any, of the located segment that have an access activity value that is less than the first predetermined threshold.

4. A method as set forth in claim 3 and further including the steps of writing the data units from the first buffer to the first partition and writing the data units from the second buffer to the second partition.

5. A method as set forth in claim 1 and further including a step of periodically decreasing the activity access value for each data unit that is not accessed.

6. A method as set forth in claim 1 and further including a data cache that is interposed between the data processor and the disk manager and, in response to an occurrence of a destage of a data unit from the data cache, the destaged data unit not having been modified while stored within the data cache, performing the steps of:

determining if the destaged data unit corresponds to a data unit within the second partition and, if yes, determining if the access activity value for the corresponding data unit is greater than the first predetermined threshold and, if yes, storing the destaged data unit within the first partition.

7. A method as set forth in claim 1 wherein each of the data units is comprised of a logical track, and further comprising a data cache that is interposed between the data processor and the disk manager, and a write buffer for storing data units that are destaged from the data cache prior to being written to the disk data storage subsystem, wherein said write buffer has a size that exceeds a size of a segment, and further including a step of sorting the destaged data units within the write buffer so as to at least order the data units by logical track number.

8. A method as set forth in claim 1 and further including the steps of:

maintaining a segment record indicating occupied segments and clear segments within the first partition, the segment record including for each occupied segment a combination value representing a combination of the access activity values for each of the constituent valid data units of the segment and further including an occupancy value representing a number of valid constituent data units of the segment;

responsive to a condition wherein the disks are determined to be idle, determining if the minimum activity segment has a combination value that is less than the first predetermined threshold, and if yes;

reading from disk and storing in a first buffer those valid data units, if any, of the collected segment that have an access activity value that is greater than the first predetermined threshold;

reading from disk and storing in a second buffer those valid data units, if any, of the idle segment that have an access activity value that is less than the first predetermined threshold;

responsive to the minimum activity segment not having a combination value that is less than the first predetermined threshold;

determining if the minimum activity segment has an occupancy value that is less than a second predetermined threshold, and if yes;

reading from disk and storing in the first buffer those valid data units, if any, of the collected segment that have an access activity value that is greater than the first predetermined threshold; and reading from disk and storing in the second buffer those valid data units, if any, of the collected segment that have an access activity value that is less than the first predetermined threshold.

9. A method as set forth in claim 1 wherein the second partition is operated as other than a log-structured file system and wherein all active and all inactive data units are assigned a storage location within the second partition.

10. A method as set forth in claim 1 wherein the second partition is operated as other than a log-structured file system and, responsive to a message generated by the data processor, accessing data units from the second partition and not from the first partition.

11. A method as set forth in claim 1 wherein the second partition is operated as other than a log-structured file system, and wherein the inactive data units are stored within the second partition to include unused storage locations enabling the data units to be updated and increased in size without requiring that an updated data unit be rewritten to another location within the second partition.

12. A data processing system comprising a data processor and a disk data storage subsystem, comprising:

a disk manager coupled to said disk data storage subsystem for controlling accesses to said disk data storage subsystem from said data processor, said disk manager managing said disk data storage subsystem as a log-structured file system having a first partition for storing segments comprised of active data units each of which has, when stored, an access activity value that exceeds a first predetermined threshold, and a second partition for storing segments comprised of inactive data units each of which has an access activity value, when stored, that is less than the first predetermined threshold.

13. A data processing system as set forth in claim 12 wherein the segments that are stored within the first partition are stored in physically adjacent tracks on at least one surface of at least one disk, wherein the physically adjacent tracks begin with an initial track, wherein the initial track is located at approximately the middle of all of the tracks on the surface, and wherein the other physically adjacent tracks are arrayed on both sides of the initial track.

14. A data processing system as set forth in claim 12 wherein said disk manager further includes means for maintaining a segment record indicating occupied segments and clear segments within the first partition, the segment record including for each occupied segment a sum value representing a combination that is a summation or an average value of the access activity values for each of the constituent valid data units of the segment, and further comprising means, responsive to a condition wherein a number of clear segments is less than a predetermined value, for accessing in turn occupied segments of the first partition to locate a segment having a combination value that is less than the first predetermined threshold, and for storing in a first buffer those valid data units, if any, of the located segment that have an access activity value that is greater than the first predetermined threshold and for storing in a second buffer those valid data units, if any, of the located segment that have an access activity value that is less than the first predetermined threshold.

15. A data processing system as set forth in claim 14 wherein the segment record further includes, for each occupied segment, an occupancy value representing a number of valid constituent data units of the segment, and wherein said disk manager is responsive to a condition wherein all of the occupied segments have a combination value that is greater than the first predetermined threshold for accessing in turn occupied segments of the first partition to locate a segment having an occupancy value that is less than a second predetermined threshold, and for storing in the first buffer those valid data units, if any, of the located segment that have an access activity value that is greater than the first predetermined threshold and for storing in the second buffer those valid data units, if any, of the located segment that have an access activity value that is less than the first predetermined threshold.

16. A data processing system as set forth in claim 15 wherein said disk manager further includes means for writing the data units from the first buffer to the first partition and for writing the data units from the second buffer to the second partition.

17. A data processing system as set forth in claim 15 wherein each of the data units is comprised of a logical track of compressed data.

18. A data processing system as set forth in claim 12 wherein said disk manager includes means for periodically decreasing the activity access value for each data unit that is not accessed.

19. A data processing system as set forth in claim 12 and further including a data cache that is interposed between said data processor and said disk manager, and wherein said disk manager is responsive to a destage of a data unit from said data cache, the destaged data unit not having been modified while stored within the data cache, for determining if the destaged data unit corresponds to a data unit within the second partition and, if yes, for determining if the access activity value for the corresponding data unit is greater than the first predetermined threshold and, if yes, for storing the destaged data unit within the first partition.

20. A data processing system as set forth in claim 12 wherein each of the data units is comprised of a logical track, and further comprising a data cache that is interposed between said data processor and said disk manager, and a write buffer for storing data units that are destaged from said data cache prior to being written to said disk data storage subsystem, wherein said write buffer has a size that exceeds a size of a segment, and wherein said disk manager includes means for sorting said destaged data units within said write buffer so as to at least order the data units by logical track number.

21. A data processing system as set forth in claim 12 wherein said disk manager further includes means for maintaining a segment record indicating occupied segments and clear segments within the first partition, the segment record including for each occupied segment a combination value representing a combination of the access activity values for each of the constituent valid data units of the segment and an occupancy value representing a number of valid constituent data units of the segment, and further comprising means, responsive to a condition wherein the disks are idle, for determining which segment of the active partition has the lowest combination access activity value (minimum activity segment) that is less than the first predetermined threshold, and for collecting (reading) and storing in a first buffer those valid data units, if any, of the minimum activity segment that have an access activity value that is greater than the first predetermined threshold and for storing in a second buffer those valid data units, if any, of the minimum activity segment that have an access activity value that is less than the first predetermined threshold, and wherein, if the minimum activity segment has a combination value that is greater than the first predetermined threshold, for first determining if the occupancy value of the minimum activity segment is less than a second predetermined threshold and if yes, for collecting (reading) and storing in the first buffer those valid data units, if any, of the located segment that have an access activity value that is greater than the first predetermined threshold and for storing in the second buffer those valid data units, if any, of the located segment that have an access activity value that is less than the first predetermined threshold.

22. A data processing system comprising a data processor and a disk data storage subsystem, comprising:

a disk manager coupled to said disk data storage subsystem for controlling accesses to said disk data storage subsystem from said data processor, said disk manager managing said disk data storage subsystem to have a first partition operated as a log-structured file system for storing segments comprised of active data units each of which has, when stored, an access activity value that exceeds a first predetermined threshold, said disk manager further managing said disk data storage subsystem to have a second partition for storing segments comprised of inactive data units each of which has an access activity value, when stored, that is less than the first predetermined threshold, wherein the second partition is operated as other than a log-structured file system.

23. A data processing system as set forth in claim 22 wherein all active and all inactive data units are assigned a storage location within the second partition.

24. A data processing system as set forth in claim 22 wherein said disk manager is responsive to a signal generated by said data processor to access data units from said second partition and not from said first partition.

25. A data processing system as set forth in claim 22 wherein said inactive data units are stored within said second partition to include unused storage locations enabling said data units to be updated and increased in size without requiring that an updated data unit be rewritten to another location within the second partition.

* * * * *